US010373349B2

(12) United States Patent
Koehler et al.

(10) Patent No.: US 10,373,349 B2
(45) Date of Patent: Aug. 6, 2019

(54) IMAGE GENERATION APPARATUS

(71) Applicant: KONINKLIJKE PHILIPS N.V., Eindhoven (NL)

(72) Inventors: Thomas Koehler, Norderstedt (DE); Axel Thran, Hamburg (DE); Frank Bergner, Hamburg (DE); Bernhard Johannes Brendel, Norderstedt (DE); Rolf Dieter Bippus, Hamburg (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 192 days.

(21) Appl. No.: 15/125,608

(22) PCT Filed: Mar. 18, 2015

(86) PCT No.: PCT/EP2015/055655
§ 371 (c)(1),
(2) Date: Sep. 13, 2016

(87) PCT Pub. No.: WO2015/144516
PCT Pub. Date: Oct. 1, 2015

(65) Prior Publication Data
US 2017/0004637 A1 Jan. 5, 2017

(30) Foreign Application Priority Data

Mar. 26, 2014 (EP) .................................... 14161737

(51) Int. Cl.
*G06T 11/00* (2006.01)
(52) U.S. Cl.
CPC ....... *G06T 11/006* (2013.01); *G06T 2211/408* (2013.01); *G06T 2211/424* (2013.01)
(58) Field of Classification Search
CPC .......................... G06T 11/006; G06T 2211/424
See application file for complete search history.

(56) References Cited

U.S. PATENT DOCUMENTS

2003/0156684 A1* 8/2003 Fessler .................. A61B 6/032
378/210
2010/0190509 A1* 7/2010 Davis ................. H04W 56/006
455/456.1
(Continued)

FOREIGN PATENT DOCUMENTS

WO 2005/010561 2/2005
WO 2007/034342 3/2007

OTHER PUBLICATIONS

Venkatakrishnan, et al., Model based iterative reconstruction for Bright Field electron tomography, Proceedings of SPIE, vol. 8657, Feb. 14, 2013.

(Continued)

*Primary Examiner* — Gandhi Thirugnanam
(74) *Attorney, Agent, or Firm* — Larry Liberchuk

(57) ABSTRACT

The invention relates to an image generation apparatus (1) for generating an image of an object. A reconstruction unit (10) reconstructs the image based on provided measured projection values such that costs defined by a cost function are reduced, wherein the cost function depends on differences between calculated projection values, which have been determined by simulating a forward projection through the image, and the provided measured projection values, and wherein a degree of dependence of the cost function on a respective difference depends on the respective difference. This can allow for a consideration of a degree of disturbance of the measured projection values by motion and/or by an incomplete illumination of the object during the reconstruction process, which can lead to a reconstruction of an image having an improved image quality.

20 Claims, 2 Drawing Sheets

(56) References Cited

U.S. PATENT DOCUMENTS

| | | | |
|---|---|---|---|
| 2010/0310144 A1* | 12/2010 | Chen | G06T 11/006 382/131 |
| 2011/0150305 A1 | 6/2011 | Zeng et al. | |
| 2012/0305780 A1* | 12/2012 | Thiruvenkadam | A61B 6/037 250/363.03 |
| 2013/0156284 A1* | 6/2013 | Koehler | G06T 11/006 382/131 |
| 2013/0343673 A1 | 12/2013 | Pal et al. | |
| 2015/0018698 A1* | 1/2015 | Safran | G06F 17/11 600/508 |
| 2015/0170405 A1* | 6/2015 | Hu | H04N 5/76 345/427 |
| 2015/0300965 A1* | 10/2015 | Sezginer | G01N 23/201 378/86 |
| 2015/0371396 A1* | 12/2015 | Bhowmick | G06T 7/80 382/154 |
| 2017/0004637 A1* | 1/2017 | Koehler | G06T 11/006 |
| 2017/0176629 A1* | 6/2017 | Omeragic | G01V 3/28 |
| 2017/0300631 A1* | 10/2017 | Bertrand | G06F 19/322 |
| 2018/0182128 A1* | 6/2018 | Champley | G06T 11/003 |

OTHER PUBLICATIONS

Hutton, et al., "Iterative reconstruction methods", Jan. 1, 2006, Quantitative Analysis in Nuclear Medicine Imaging.

Nuyts, et al., "Modelling the physics in the iterative reconstruction for transmission computed tomography", Journal of Physics in Medicine and Biology, 58(12), 2013.

Zeng, et al., "Correction of Iterative Reconstruction Artifacts in Helical Cone-Beam CT", 10th International Meeting on Fully Three-Dimensional Image Reconstruction in Radiology and Nuclear Medicine, 2010.

Xu, et al., "Electronic Noise Modeling in Statistical Iterative Reconstruction", IEEE Transactions on Image Processing, vol. 18, No. 6, Jun. 2009.

Ma, et al., "Variance analysis of x-ray CT sinograms in the presence of electronic noise background", Med. Phys. 39 (7), Jul. 2012.

Takahashi, et al., "Motion Tolerant Iterative Reconstruction Algorithm for Cone-Beam Helical CT Imaging", 11th International Meeting on Fully Three-Dimensional Image Reconstruction in Radiology and Nuclear Medicine, 2011.

* cited by examiner

IMAGE GENERATION APPARATUS

CROSS REFERENCE TO RELATED APPLICAITONS

This application is the U.S. National Phase application under 35 U.S.C. § 371 of International Application No. PCT/EP2015/055655, filed Mar. 18, 2015, published as WO 2015/144516 on Oct. 1, 2015, which claims the benefit of European Patent Application Number 14161737.3 filed Mar. 26, 2014. These application are hereby incorporated by reference herein.

FIELD OF THE INVENTION

The invention relates to an image generation apparatus, method and computer program for generating an image of an object.

BACKGROUND OF THE INVENTION

In known computed tomography (CT) systems an x-ray source rotates around an object to be imaged, while the x-ray source emits x-rays and an x-ray detector detects the x-rays after having traversed the object, in order to generate projection values. The projection values are used for reconstructing an image of the object, wherein the reconstruction may include an iterative reconstruction procedure which is adapted to reconstruct the image by minimizing a cost function that depends on a quadratic difference between calculated projection values, which are determined by simulating a forward projection through the image, and the projection values that have been generated based on the detected x-rays.

The iterative reconstruction procedure can yield images of the object having a good quality, if the object is not moving and/or if the object has been completely illuminated by the x-rays. However, if the object is moving and/or if the object has not been illuminated completely, the quality of the reconstructed image may be reduced.

The article "Model based iterative reconstruction for Bright Field electron tomography" by Singanallur V. Venkatakrishnan et al., Proceedings of SPIE, volume 8657, pages 86570A-1 to 86570A-12 (2013) discloses an apparatus for acquiring Bright Field electron tomography (BF-ET) images using a Model based iterative reconstruction algorithm which accounts for the presents of anomalous measurements from Bragg scatter in the data during the iterative reconstruction. The method accounts for anomalies by formulating the reconstruction as minimizing a cost function which rejects measurements that deviate significantly from the typical Beer's law model assumed for BF-ET.

SUMMARY OF THE INVENTION

It is an object of the present invention to provide an image generation apparatus, method and computer program for generating an image of an object, which allows for a generation of an image having an improved quality.

In a first aspect of the present invention an image generation apparatus for generating an image of an object is presented, wherein the image generation apparatus comprises:
  a measured projection values providing unit for providing measured projection values of the object,
  a reconstruction unit for reconstructing the image based on the provided measured projection values such that costs defined by a cost function are reduced, wherein the cost function depends on differences between calculated projection values, which have been determined by simulating a forward projection through the image, and the provided measured projection values, and
  wherein a degree of dependence of the cost function on a respective difference depends on the respective difference such that the cost function depends less on a first respective difference than it depends on a second respective difference which is smaller than the first respective difference
  or wherein the cost function depends on parameters calculated for sets of differences based on the differences included in the sets of differences, the degree of dependence of the cost function on a parameter for a respective set of differences depending on the parameter such that the cost function depends less on a parameter for a first set of differences than it depends on a parameter for a second set of differences, which is smaller than the parameter for the first set of differences.

Since the degree of dependence of the cost function on a respective difference depends on the respective difference in one of the suggested alternative solutions, during the reconstruction process the amount of the respective difference can be considered. For instance, if the respective difference is relatively large compared to, for instance, a known level of additive noise, it can be assumed that this large difference is caused by a movement of the object and/or by an incomplete illumination of the object, and the cost function may depend less on this respective difference, whereas, if the respective difference is relatively small, it can be assumed that the respective projection values are not adversely affected by motion and/or an incomplete illumination, and the cost function can depend stronger on this respective difference. Thus, the dependence of the degree of dependence of the cost function on the respective difference allows for a consideration of the degree of disturbance of the measured projection values by motion and/or by an incomplete illumination of the object during the reconstruction process, thereby allowing for a reconstruction of an image having an improved image quality.

In the other suggested alternative solution, the image reconstruction is made on the basis of sets of differences, where a parameter is determined for each set based on the differences included in the respective set. Each of the sets comprises two or more differences. Since the degree of dependence of the cost function on a parameter for a respective set of differences depends on the parameter and, thus, the differences within the set, the undesired influence of disturbances of measured projections values caused by systematic deviations resulting from motion or similar conditions can be further decreased. In particular, it can be achieved that smaller systematic deviations of projections values are sufficient for the cost function to depend less on the differences involving such systematic deviations. Hereby, the image quality of the reconstructed image can be further improved.

The measured projection values are, for instance, measured intensity values being indicative of intensities of radiation that has traversed the object in different directions, or measured line integral values which correspond to projections of a property of the object like absorption and/or scattering properties along different lines through the object. Correspondingly, the calculated projection values are, for instance, simulated intensity values being indicative of simulated intensities of radiation that has traversed the image of the object in different directions during a simulation, or simulated line integral values which correspond to simulated projections through the image of the object along different lines through the image.

The measured projection values providing unit can comprise a storing unit, in which the measured projection values are stored already and from which the stored measured projection values can be provided, and/or it can comprise an acquisition unit for acquiring the projection values. The measured projection values providing unit can also be adapted to receive the measured projection values from another unit and to provide the received measured projection values to the reconstruction unit. For instance, the image generation apparatus can be an entire imaging system including an acquisition unit and the reconstruction unit, or the image generation apparatus can just be a computing apparatus being adapted to receive and optionally store the measured projection values and to reconstruct the image based on the measured projection values.

The reconstruction unit is preferentially adapted to generate a CT image based on the provided measured projection values. In particular, the reconstruction unit is adapted to iteratively reconstruct the image such that the costs defined by the cost function are reduced. The projection values preferentially relate to the absorption of the object, but they may also relate to other properties of the object like scattering properties. The object is preferentially a living object like a person or an animal. However, the object may also be a technical object.

It is preferred that the cost function is adapted to depend stronger on a respective difference, if the respective difference is smaller than a threshold, and to depend less on a respective difference, if the respective difference is larger than the threshold. The threshold may depend on the standard deviation of the measured projection value to which the respective difference corresponds. For instance, the threshold may be a multiple of the standard deviation of the measured projection value to which the respective difference corresponds. Using these thresholds for deciding whether the cost function should depend stronger on the respective difference or not can further improve the quality of the reconstructed image.

In a preferred embodiment the cost function is adapted to depend quadratically on a respective difference, if the respective difference is smaller than a threshold, and to depend linearly on a respective difference, if the respective difference is larger than the threshold. These dependencies of the cost function on the respective difference also lead to a further improved quality of the reconstructed image. Moreover, also in this case the threshold may depend on the standard deviation of the measured projection value to which the respective difference corresponds; in particular, the threshold may be a multiple of the standard deviation of the measured projection value to which the respective difference corresponds.

In an embodiment the cost function is configured such that the degree of dependence of the cost function on the respective difference depends on the respective difference and on the standard deviation of the measured projection value to which the respective difference corresponds. Moreover, in an embodiment the cost function may be adapted to depend on the standard deviation of the measured projection value to which the respective difference corresponds, wherein the cost function may depend stronger on the standard deviation of the measured projection value to which the respective difference corresponds, if the respective difference is smaller than a threshold, and depend less on the standard deviation of the measured projection value to which the respective difference corresponds, if the respective difference is larger than the threshold. For instance, the cost function is adapted to quadratically depend on the inverse standard deviation of the measured projection value to which the respective difference corresponds, if the respective difference is smaller than a threshold, and to linearly depend on the inverse standard deviation of the measured projection value to which the respective difference corresponds, if the respective difference is larger than the threshold. Also these dependencies lead to a further improved quality of the reconstructed image.

In an embodiment the cost function comprises a Huber potential, which may also be regarded as being a Huber loss function and which depends on the differences between the calculated projection values, which have been determined by simulating a forward projection through the image, and the provided measured projection values. In particular, in an embodiment the projection values may be line integral values and a cost function $L(\mu)$ may be defined by $$L(\mu) = \sum_i w_i \Psi\left(\sum_j a_{ij}\mu_j - y_i, c\sigma_i\right) \text{ with} \quad (1)$$

$$\Psi(x, \delta) = \begin{cases} 0.5x^2 & \text{for } |x| \leq \delta \\ \delta|x| - 0.5\delta & \text{for } |x| > \delta \end{cases} \text{ and} \quad (2)$$

$$w_i = b\sigma_i^{-2}, \quad (3)$$

wherein $\mu$ denotes the image, $\mu_j$ denotes image values of the image $\mu$, $$\sum_j a_{ij}\mu_j$$

denotes the calculated line integral values, $y_i$ denotes the measured line integral values, $\sigma_i$ denotes the standard deviations, and b and c define constants, which may be user defined or fixed. In a preferred embodiment b is just one and the constant c is predefined such that the image quality is optimized. The constants b and/or c may be determined by calibration. The constant c may be, for instance, two or three. The elements $a_{ij}$ are elements of a system matrix defining the forward projection, i.e. the linear coefficients between the j-th image element and the i-th line integral value, i.e. the i-th radiation path. Moreover, the function $\Psi$ may be regarded as being a Huber potential.

In an embodiment, each of the measured projection values is generated based on a measurement of radiation, which has been generated by a radiation source, after having traversed an object along a radiation path. In case of the reconstruction of CT images, the radiation source is an x-ray source rotating around the object. The radiation traversing the object is preferably measured using a suitable detection element, where the relative position of the detection element and the radiation source defines the radiation path.

In an embodiment it is provided that for at least one of the radiation paths, plural projection values are generated, each projection value being generated in accordance with one of plural materials. Such projection values may be generated on the basis of measurements performed for the radiation path in different energy ranges. In case of a CT system, these measurements may e.g. be made using a dual layer CT scanner performing measurements in two energy ranges or using a so-called spectral or photon-counting CT scanner which is capable of measuring individual photons and to determine their energy. In accordance with a so-called material decomposition, the projection values for the different materials can be generated on the basis of measured projection values for the different energies. Thereupon, one or more images may be reconstructed using a cost function depending on differences between the generated projection values for the different materials and corresponding calculated projection values determined on a basis of a simulation. Since the projection values generated in accordance with the material decomposition are generated on the basis of measurements (in contrast to the calculated projection values determined on the basis of a simulation), they are also referred to as measured projection values herein.

In one embodiment, the cost function depends on a transform of a vector specifying the differences between the measured projection values and the calculated projection values for one radiation path and the plural materials or on a set of transforms of vectors specifying the difference between the measured and the calculated projection values for plural radiation paths and the plural materials, each transform being calculated based on eigenvectors of a covariance matrix indicating covariances between the projection values for the plural materials. In addition, the cost function may depend on the eigenvalues of the covariance matrix.

Using such a transform of the vector specifying the differences between the measured projection values and the calculated projection values for one radiation path and the plural materials, it is easily possible to perform the image reconstruction on the basis of a cost function which corresponds to the cost function described above. For instance, it is possible to use a cost function which is based on the Huber potential in a similar way as described above.

In connection with the alternative solution providing for an image reconstruction on the basis of sets of differences, one embodiment comprises that each set of differences includes differences calculated for projection values measured at adjacent locations and/or consecutive detection times. This embodiment exploits the fact that systematic deviations resulting from object motion or similar conditions usually affect a number of spatially and/or timely neighbouring projections values.

In a further embodiment, the parameter for a set of differences corresponds to a square root of a sum of squares or weighted squares of the differences included in the set. The weighting of the squares of differences may be made using a weighting factor which may be calculated on the basis of the corresponding variance. In particuler, the weighting factors may be equal and/or proportional to the inverse variances.

In a related embodiment, the cost function depends quadratically on the parameter for the second set of differences and the cost function depends less than quadratically on the parameter for the first set of differences. This ensures the conventional form of the cost function with respect to a certain set of differences in case the parameter for this set is relatively small, and mitigates artifacts resulting from systematic deviations of the measured projection values, since such systematic deviations may lead to a relatively large parameter for the set of differences including such deviations.

Moreover, one embodiment provides that the parameter for the first set of differences is larger than a predetermined threshold and the parameter for the second set of differences is smaller than the predetermined threshold, the threshold particularly being selected such that the parameter for sets of differences resulting from statistical fluctuations of the measured projection values is smaller than the threshold in a predetermined percentage of cases. Hereby, it can be ensured that statistical fluctuations are considered in the conventional manner while the influence of systematic deviations of measured projectios values can be reduced. The predetermined percentage is preferably greater than 80% and more preferably greater than 90%. In particular, the predetermined percentage may be 95%.

In a further aspect of the present invention an image generation method for generating an image of an object is presented, wherein the image generation method comprises:

providing measured projection values of the object by a measured projection values providing unit, reconstructing the image based on the provided measured projection values such that costs defined by a cost function are reduced by a reconstruction unit, wherein the cost function depends on differences between calculated projection values, which have been determined by simulating a forward projection through the image, and the provided measured projection values, and wherein a degree of dependence of the cost function on a respective difference depends on the respective difference such that the cost function depends less on a first respective difference than it depends on a second respective difference which is smaller than the first respective difference or wherein the cost function depends on parameters calculated for sets of differences based on the differences included in the sets of differences, the degree of dependence of the cost function on a parameter for a respective set of differences depending on the parameter such that the cost function depends less on a parameter for a first set of differences than it depends on a parameter for a second set of differences, which is smaller than the parameter for the first set of differences.

In a further aspect of the present invention an imaging computer program for generating an image of an object is presented, wherein the imaging computer program comprises program code means for causing an image generation apparatus as defined in claim 1 to carry out the steps of the image generation method as defined in claim 14, when the computer program is run on a computer controlling the image generation apparatus.

It shall be understood that the image generation apparatus of claim 1, the image generation method of claim 14, and the imaging computer program of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
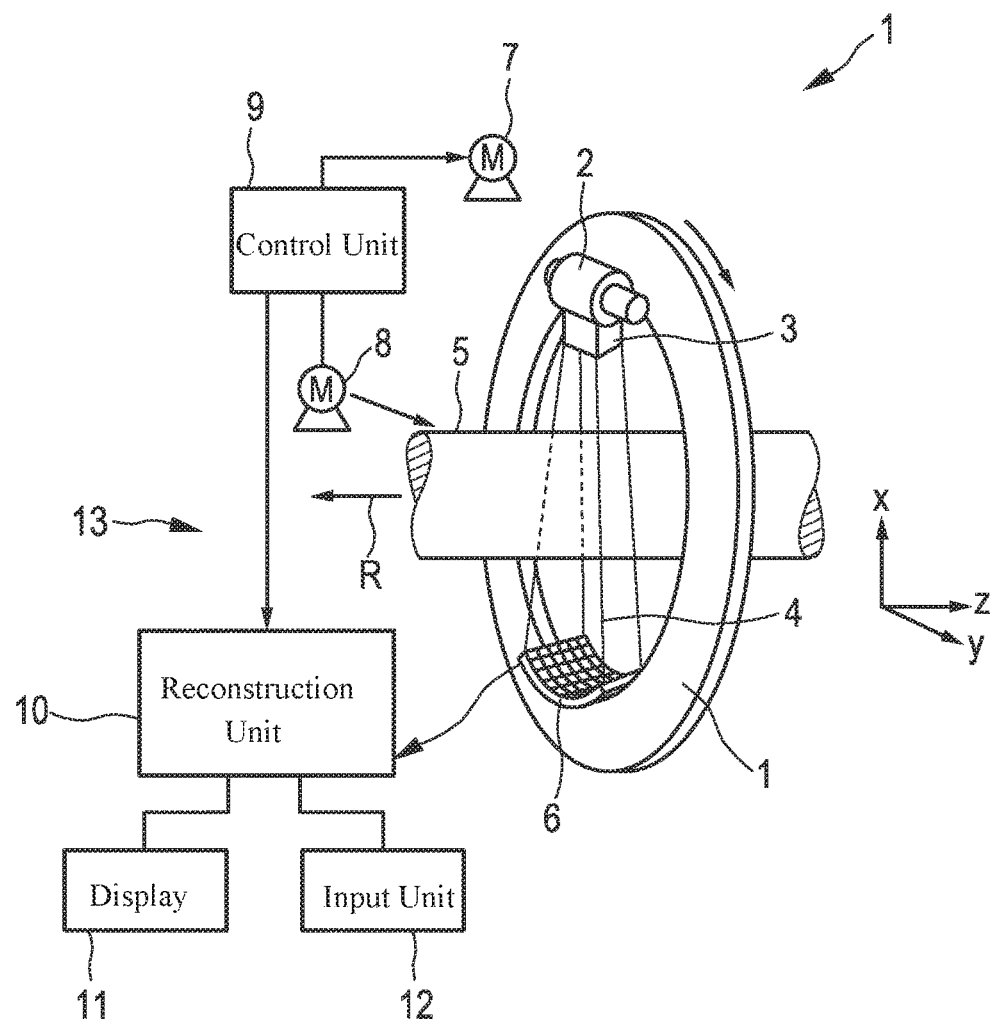
FIG. 1 shows schematically and exemplarily an embodiment of an image generation apparatus for generating an image of an object.

FIG. 1 shows schematically and exemplarily an embodiment of an image generation apparatus for generating an image of an object. In this embodiment the image generation apparatus is a CT apparatus 1. The CT apparatus 1 includes a gantry 12 which is capable of rotation about a rotational axis R which extends parallel to a z direction. A radiation source 2, which is, in this embodiment, an x-ray tube, is mounted on the gantry 12. The radiation source 2 is provided with a collimator 3, which forms, in this embodiment, a conical radiation beam 4 from the radiation generated by the radiation source 2. The radiation traverses an object (not shown), such as a patient, within an examination zone 5 being, in this embodiment, cylindrical. After having traversed the examination zone 5 with the object, the radiation beam 4 is incident on a detection device 6, which comprises a two-dimensional detection surface. The detection device 6 is also mounted on the gantry 12.

The CT apparatus 1 further comprises two motors 7, 8. The gantry 12 is driven at a preferably constant but adjustable angular speed by the motor 7. The motor 8 is provided for displacing the object, for example, a patient arranged on a patient table, within the examination zone 5 parallel to the direction of the rotational axis R or the z-axis. These motors 7, 8 are controlled by a control unit 9, for instance, such that the radiation source 2 and the object move relatively to each other along a helical trajectory. However, it is also possible that the object is not moved, but that only the radiation source 2 is moved, i.e. that the radiation source 2 moves along a circular trajectory relative to the object. Furthermore, in another embodiment the collimator 3 can be adapted for forming another beam shape, in particular a fan beam, and the detection device 6 can comprise a detection surface, which is shaped corresponding to the other beam shape, in particular to the fan beam.

During a relative movement of the radiation source 2 and the object the detection device 6 generates projection values depending on the radiation incident on the detection surface of the detection device 6. The detection device 6 is preferentially adapted to determine line integral values, i.e. measured line integral values, based on the incident radiation as projection values, especially in accordance with following equation:

$$y_i = \ln\left(\frac{I_{0,i}}{I_i}\right), \quad (4)$$

wherein $y_i$ denotes the respective line integral value, which corresponds to a radiation path defined by an i-th combination of a position of the radiation source 2 relative to the object and by a position of a detection element of the two-dimensional detection surface of the detection device 6, $I_{0,i}$ denotes the intensity of the radiation along the respective radiation path before traversing the object and $I_i$ denotes the intensity along the respective radiation path after having traversed the object.

The gantry 12 with the radiation source 2, the detection device 6 and the motors 7, 8 provide the measured line integral values $y_i$ to a reconstruction unit 10 and can therefore be regarded as forming a measured projection values providing unit 13.

The reconstruction unit 10 is adapted to iteratively reconstruct the image of the object based on the provided measured line integral values $y_i$ such that costs defined by a cost function are reduced, wherein the cost function depends on differences between calculated line integral values, which have been determined by simulating a forward projection through the image, and the provided measured line integral values $y_i$, and wherein a degree of dependence of the cost function on a respective difference depends on the respective difference. In particular, the cost function is adapted to depend stronger on a respective difference, if the respective difference is smaller than a threshold, and to depend less on a respective difference, if the respective difference is larger than the threshold. For example, the cost function can be adapted to depend quadratically on a respective difference, if the respective difference is smaller than the threshold, and to depend linearly on the respective difference, if the respective difference is larger than the respective threshold. Moreover, the cost function may be adapted such that the degree of dependence of the cost function on the respective difference further depends on the standard deviation $\sigma_i$ of the measured line integral value $y_i$ to which the respective difference corresponds. Also the dependence of the cost function on the standard deviation $\sigma_i$ may depend on a comparison of the respective difference with a threshold. In particular, the cost function can be adapted to depend stronger on the standard deviation $\sigma_i$ of the measured line integral value $y_i$ to which the respective difference corresponds, if the respective difference is smaller than a threshold, and to depend less on the standard deviation $\sigma_i$ of the measured line integral value $y_i$ to which the respective difference corresponds, if the respective difference is larger than the threshold. For example, the cost function can be adapted to quadratically depend on the inverse standard deviation $\sigma_i^{-1}$ of the measured line integral value $y_i$ to which the respective difference corresponds, if the respective difference is smaller than a threshold, and to linearly depend on the inverse standard deviation $\sigma_i^{-1}$ of the measured line integral value $y_i$ to which the respective difference corresponds, if the respective difference is larger than the threshold.

The threshold preferentially depends on the standard deviation $\sigma_i$ of the measured line integral value $y_i$ to which the respective difference corresponds. In particular, the threshold is a multiple of the standard deviation $\sigma_i$ of the measured line integral value $y_i$ to which the respective difference corresponds.

Preferentially, the cost function $L(\mu)$ is defined as defined by above mentioned equations (1) to (3), wherein the reconstruction unit 10 is adapted to amend the absorption values $\mu_j$, until the cost function has reached a minimum value.

One way of minimizing the cost function $L(\mu)$ is the so-called separable-parabolic-surrogate algorithm. It iteratively computes the image with the update formula for the n-th iteration as $$\mu_k^{(n+1)} = \mu_k^{(n)} - \frac{\sum_i a_{ik} w_i \Psi\left(\sum_j a_{ij}\mu_j - y_i, c\sigma_i\right)}{\sum_i a_{ik} w_i \dot{\Psi}\left(\sum_j a_{ij}\mu_j - y_i, c\sigma_i\right)\sum_j a_{ij}} \quad \text{with} \quad (5)$$

$$\Psi(x, \delta) = \begin{cases} x & \text{for } |x| \leq \delta \\ \delta \cdot \text{sign}(x) & \text{for } |x| > \delta \end{cases} \quad \text{and} \quad (6)$$

$$\dot{\Psi}(x, \delta) = \begin{cases} 1 & \text{for } |x| \leq \delta \\ \dfrac{\delta}{|x|} & \text{for } |x| > \delta \end{cases}. \quad (7)$$

Equation (5) is an update based on Newton's method where the Hessian matrix is approximated as a diagonal matrix. Its entries are essentially the denominator values in equation (5), while the cost function gradient entries are in the numerator. The Hessian approximation is also designed in a way that the resulting cost function approximation is tangent to the original cost function in the point $\mu^{(n)}$ and lies above it for other values. Equation (6) is the derivative of the Huber potential with respect to the input argument, while equation (7) is an approximated second derivative of the Huber potential, which has a non-vanishing value in the linear part of the function.

In an embodiment the reconstruction unit 10 can be adapted to assume that the photons of the radiation detected by the detection device 6 follow a Poisson distribution such that the variance $\sigma_i^2$ can be regarded as being proportional to the respective intensity $I_i$. Thus, the standard deviation $\sigma_i$ may be determined by using the equation $\sigma_i^2 = dI_i$, wherein d is a constant that may be predefined such that the image quality is further improved. The constant d may depend on the respective system for generating the projection values, particularly on a respective detection element of the detection surface of the detection device 6, and/or the respective intensity. It may be determined by calibration. For instance, during calibration for a fixed intensity several projection values, especially line integral values, can be determined for each detection element of the detection surface, wherein based on the several projection values a mean projection value and a variance may be determined for each detection element. The determined variance can then be used together with the known intensity meeting the detection device for determining the constant. This calibration procedure is preferentially carried out in a stationary state, i.e. when the gantry is not moving. Moreover, in an embodiment the calibration may be performed for different intensities such that d may depend on the intensity.

Generally, the variances may be determined, especially estimated, in accordance with $\sigma_i^2 = \Gamma(I_i)$, wherein $\Gamma(I_i)$ can incorporate the expected noise levels from the detected photons, but also include the expected noise from the detector electronics or other units in the detection system. The function $\Gamma(I_i)$ can be determined by, for instance, choosing an estimator for the variance of the stochastic measurement signal from the given intensity. This estimator is in most cases designed to have a low mean squared error with respect to the true variance, i.e. $E\{(\sigma_{true,i}^2 - \Gamma(I_i))^2\}$. Furthermore, the estimator can be optimized to have further properties like a low bias, i.e. a low residual deviation of the expected mean to the real mean of the estimated $\sigma_i^2$. The selection of an appropriate estimator is a non-trivial problem so that commonly and preferentially approximations are used like the approximations described in the article "Modelling the physics in the iterative reconstruction for transmission computed tomography" by J. Nuyts et al., Journal of Physics in Medicine and Biology, 58(12), 2013, which is herewith incorporated by reference.

The reconstructed image is shown on a display 11. The CT apparatus 1 further comprises an input unit 12 like a keyboard, a computer mouse, a touch screen, et cetera, in order to allow a user like a physician to input commands like a start command for starting an acquisition, a stop command for stopping an acquisition, acquisition parameters, reconstruction parameters, et cetera into the CT apparatus 1.

Figure 2:
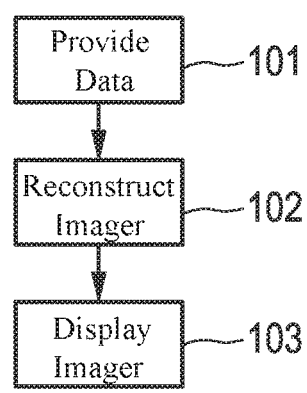
FIG. 2 shows a flowchart exemplarily illustrating an embodiment of an image generation method for generating an image of the object.

In the following an embodiment of an image generation method for generating an image of an object will exemplarily be described with reference to a flowchart shown in FIG. 2.

In step 101 measured line integrals of the object are provided by the measured projection values providing unit 13, wherein the measured line integral values correspond to integrals of the absorption of the object along different lines through the object. In step 102 the reconstruction unit 10 reconstructs the image based on the provided measured line integral values such that costs defined by a cost function are reduced, wherein the cost function depends on differences between calculated line integral values, which have been determined by simulating a forward projection through the image, and the provided measured line integral values, and wherein a degree of dependence of the cost function on a respective difference depends on the respective difference. In particular, the cost function defined in equations (1) to (3) is minimized by the reconstruction unit 10, in order to iteratively reconstruct the image. In step 103 the reconstructed image is shown on the display 11.

Known iterative reconstruction algorithms are commonly prone to inconsistencies like motion or missing projection data as the model underlying the known iterative reconstruction algorithms expects a motionless, fully exposed object. The known iterative reconstruction algorithms introduce artifacts, in order to explain differences between measured line integral values and calculated line integral values, which have been calculated by simulating a forward projection through the current version of the reconstructed image during the iterative reconstruction process. These introduced artifacts are usually much stronger than artifacts caused by non-iterative reconstruction algorithms like filtered backprojection reconstruction algorithms. In order to provide an iterative reconstruction algorithm, which does not show these strong artifacts, the above described cost functions are preferentially used by the reconstruction unit 10. These cost functions preferentially use a non-linear mapping of the differences between the measured line integral values and the calculated line integral values, in order to reduce the impact of outliers, i.e. the impact of large differences due to artifacts rather than noise.

The cost function preferentially uses the Huber potential parameterized such that it will reduce the influence of the difference on the reconstruction, if the difference becomes larger than, for instance, two or three times the estimated standard deviation of the noise in the respective pixel, i.e. in the respective line integral values.

Although in above described embodiments $w_i$ is $b\sigma_i^{-2}$ in other embodiments another statistical weight $w_i$ can be used. Although in the above described embodiments the reconstruction unit is adapted to use a cost function with a certain iterative reconstruction algorithm, in other embodiments other reconstruction algorithms may be used by the reconstruction unit, in particular, other statistical reconstruction algorithms. For instance, existing statistical reconstruction algorithms can be extended by modifying the difference calculation on the line integral values according to above mentioned equations (1) to (3), wherein costs defined by a cost function, which depends on differences between calculated line integral values, which have been determined by simulating a forward projection through the image, and the provided measured line integral values, are reduced and wherein a degree of dependence of the cost function on a respective difference depends on the respective difference.

Although in above described embodiments certain cost functions have been described, in other embodiments also other cost functions, especially having other mapping functions $\Psi$, which depend on differences between calculated projection values, which have been determined by simulating a forward projection through the image, and the provided measured projection values, can be used for reconstructing the image, wherein a degree of dependence of the cost function on a respective difference depends on the respective difference. In particular, other mapping functions $\Psi$ may be used, which are adapted such that, if the differences are smaller than $c\sigma_i$, the dependence of the cost function on the differences is stronger, and, if the differences are larger than $c\sigma_i$, the dependence of the cost function on the differences is weaker. For example, other mapping functions $\Psi$ may be used, which are adapted such that, if the differences are smaller than $c\sigma_i$, the cost function depends on the square of differences, and, if the differences are larger than $c\sigma_i$, the cost function depends in another way on the differences, especially less than quadratically like linearly on the differences. Preferentially, the mapping function $\Psi$ is adapted such that, if the differences are larger than $c\sigma_i$, the cost function is convex.

In the aforementioned examplary embodiments, an image is reconstructed on the basis of projection values that are particularly generated for different radiation paths and for a single energy range of the radiation. However, it is to be understood that, in a similar way, an image can be reconstructed on the basis of projection values generated for plural energy ranges associated with each radiation path. Thus, it is possible to implement a similar image reconstruction procecdure in a multi-channel CT apparatus 1, which provides measurements in plural energy ranges for each radiation path.

Such a multi-channel CT apparatus 1 may particularly be a so-called dual channel CT scanner enabling a high-energy measurment in a first energy range of the radiation and a low-energy measurement in a second energy range (lower than the first energy range) for each radiation path. Examplary embodiments of such dual channel CT scanners include dual source CT scanners and so-called dual layer CT scanners.

In a dual source CT scanner, there are two x-ray tubes and each x-ray tube emits radiation in one of the high-energy and the low-energy range. Moroever, there are two detection devices 6 and each detection device 6 is arranged to detect radiation originating from one of the x-ray tubes after having traversed the examination zone 5. The two pairs with one x-ray tubes and one detection device 6 may be mounted in the gantry 12 with an angular offset, which may e.g. be 90°. During the rotation of the gantry 12 around the axis R (see FIG. 1), a measurement for a particular radiation path is thus firstly made in one energy range using one of the x-ray tubes and one of the detection devices 6. Thereafter (particularly upon a rotation by an angle corresponding to the angular offset between the x-ray tubes), a measurement for the radiation path is made in the other energy range using the other x-ray tube and the other detection device 6.

A dual layer CT scanner uses a single x-ray tube emitting radiation in both the the high-energy range and the low energy range. The detection device 6 comprises a detection surface including two layers arranged on top of each other. One of the layers is configured for detecting radiation in the high-energy range and the other layer is configured for detecting radiation in the low-energy range. Thus, the measurments for both energy ranges are made simultaneously for each radiation path in the dual layer CT scanner.

A further example of a multi-channel CT apparatus 1 is a so-called spectral or photon-counting CT scanner. Such a CT scanner has a single radiation source 2 emitting x-rays in a certain spectral range. The detection device 6 is capable of individually measuring the energy of each incident photon. In so doing, the detectection device 6 determines one of a pluraltiy of energy bins for each photon. The energy bins devide a spectral range into sub-ranges, where each energy bin covers one interval around a certain energy value. The size of the intervals (i.e. the length of the sub-ranges) may substantially correspond to the spectral resolution of the detection device 6.

For the image reconstruction in a multi-channel CT apparatus 1, a number of measured projection values are generally available for each radition path and each of the projection values corresponds to one energy range. In a dual channel CT scanner, there are two projection values for each radiation path—in correspondence with the two energy ranges for which measurements are made in a such a CT scanner. In a spectral CT scanner, the number of projection values corresponds to the number of energy bins.

On the basis of the available projection values for each readiation path, projection values can be estimated for a number of N different materials, where N is equal to or smaller than the number of energy ranges for which measurements are made in the multi-channel CT apparatus 1. The estimation of the projection values for the N materials may be made in accordance with a so-called material decomposition, which is known to a person skilled in the art as such. The relevant materials may dispose of sufficiently different spectral properties. For example, these materials can be water and bone. However, it is also possible to estimate projection values for additional and/or different materials. In clinical applications, projection values may particularly be determined for artifical materials, such as, for example, contrast agents. Such artificial materials may particularly be so-called K-edge materials known to a person skilled in the art. The projections values for the artificial material may be determined in addition to projection values for water and bone, for example.

Each of the projection values determined in accordance with the material decomposition represents a line integral along the associated radiation path through a volume of attuation values of the resepective material. Thus, for each material one line integral value is determined per radiation path.

In contrast, a CT apparatus 1 performing measurements in a single energy range does usually allow for determining line integral values for a single material. Usually, such systems are calibrated to retrieve correct line integral values for water. Other materials usually cause aritifacts in such systems.

The material decomposition for generating the line integral values for the different material may be made based on a system of interlinked equations in which each equation corresponds to a model-based approximation of the attenuation of x-ray radiation by the different materials in one of the energy ranges in which the measurements are performed. In one embodiment, solutions of the system of equations may be estimated in order to determine the line integral values for the different materials. In further embodiments, a look-up table for estimating the line integral values from the measured projections values for the plural energy ranges may be generated on the basis of experiments and/or on the basis of model calculations. This look-up table may be stored in the CT apparatus 1, and the CT apparatus 1 may use this look-up table to determine the line integral values from the projection values measured for the relevant energy ranges.

As already explained above, the measured projection values are in general affected by noise. In order to take account of this noise, variances of the measured projection values may be determined using a suitable estimator. As the material decomposition combines projection values for different energy ranges to projections values for different materials, the noise affecting the latter projection values is correlated. Thus, account can be taken of the noise by means of a so-called covariance matrix. In particular, such a covariance matrix may be used, if Gaussian noise is assumed, which is a realistic model for CT. An estimate for the covariance matrix may be determined from the variances of the measured projection values in a similar way as the line integral values for the different materials are determined from the measurued projection values for the different energy ranges. In particular, the components of the covariance matrix may be determined from the variances of the measured projections values on the basis of a look-up table stored in the CT apparatus 1, or the components of the covariance matrix may be calculated in accordance with the system of equations on the basis of which the line integral values for the different materials are calculated.

A conventional cost function used for reconstructing the image in a multi-channel CT apparatus 1 on the basis of a covariance matrix may be $$L_{con}(\mu) = \frac{1}{2} \sum_i r_i^T S_i r_i \text{ with } r_i = \begin{pmatrix} \sum_j a_{ij}^{(1)} \mu_j^{(1)} - y_i^{(1)} \\ \ldots \\ \sum_j a_{ij}^{(N)} \mu_j^{(N)} - y_i^{(N)} \end{pmatrix} \quad (8)$$

Here, the sum is calculated over all radiation paths i. $S_i$ is the inverse covariance matrix for the radiation path i and indicates covariances between the line integral values for the plural materials n=1, . . . ,N. In particular, it describes the correlated noise across all line integral values associated with the respective radiation path i. The vector $r_i$ for a radiation path i, which is also referred to as residual vector for the radiation path i hereinanfter, includes for each material n the difference between the calculated line integral value $\sum_j \alpha_{ij}^{(n)} \mu_j^{(n)}$ and the line integral value $y_i^{(n)}$ determined on the basis of the measurements. These differences are calculated similarly as in the case of a single material/energy range, which has been discussed above.

Using the so-called eigendecomposition, which is known to the person skilled in the art as such, the inverse covariant matrix $S_i$ can be written as $S_i = Q_i \Lambda_i Q_i^T$. Here, the columns of the matrix $Q_i$ correspond to the eigenvectors (written as column vectors and preferably normalised) of the matrix $S_i$ and the matrix $\Lambda_i$ is a diagonal matrix including the eigenvalues $\lambda_{i,1}, \ldots, \lambda_{i,N}$ of the matrix $S_i$, i.e. $\Lambda_i = \text{diag}(\lambda_{i,1}, \ldots, \lambda_{i,N})$, where the eigenvalue in column n of the matrix $\Lambda_i$ corresponds to the eigenvector in column n of the matrix $Q_i$.

Using this decomposition, equation (8) can be written in the following form $$L_{con}(\mu) = \frac{1}{2} \sum_i \sum_n \lambda_{i,n} \tilde{r}_{i,n}^2, \quad (9)$$

where $\tilde{r}_{i,n}$ is n-th component of a transformed residual vector $\tilde{r}_i = Q_i^T r_i$, which is calculated on the basis of the eigenvectors of the inverse covariance matrix $S_i$ included in the matrix $Q_i$. Thus, when the components of the matrix $Q_i$ are denoted as $Q_{l,n}^i$ (l,n=1, . . . ,N), $\tilde{r}_{i,n}$ is given by:

$$\tilde{r}_{i,n} = \sum_l Q_{l,n}^i r_{i,l} = \sum_l Q_{l,n}^i \left( \sum_j a_{ij}^{(l)} \mu_j^{(l)} - y_i^{(l)} \right)$$

Due to outliners in the measured projection values, which may particularly result from movements of the object and/or an incomplete illumination and which translate into outliners of the line integral values for the different materials, the conventional cost function provided in equation (8) or the equivalent cost function provided in equation (9) can lead to artifacts in the reconstructed images for the reasons describe above. In order to reduce such artifacts, a similar approach as described above for the case of a single material can be applied on the basis of equation (9).

In particular, the reconstruction unit 10 of the multi-channel CT apparatus 1 may use a cost function of the form $$L(\mu) = \frac{1}{2} \sum_i \sum_n \psi\left(\tilde{r}_{i,n} \sqrt{\lambda_{i,n}}\right) \quad (10)$$

In order to calculate the transformed residual vectors $\tilde{r}_i$ and the values $\lambda_{i,n}$ included in this cost function, the reconstruction unit 10 may estimate the covariance matrix as explained above and may calculate these parameters particularly on the basis of the covariance matrix.

The function $\psi(x)$—and, thus, the cost function—may particularly be selected such that it has similar characteristic as the cost function used for the case of a single material/energy range described above. So, the function $\psi(x)$ may be selected such that it depends stronger on the components of the transformed residual vector, if the respective component is smaller, and that it depends less on a respective component, if the respective component is larger. In one implementation, the function $\psi(x)$ may be selected such that it depends stronger on the components of the transformed residual vector, if the respective component is smaller than a threshold, and that it depends less on a respective component, if the respective component is larger than the threshold. The threshold for a particularl material n may be calculated on the basis of the corresponding eigenvalue $\lambda_{i,n}$ of the inverse covariance matrix. This eigenvalue corresponds to the inverse variance $\sigma^2$ in the case of a single material described above.

In a specific implementation, the function $\psi(x)$ may be the Huber function $\psi(x,\delta)$ explained above. The parameter $\delta$ may be calculated individually for each radiation path i and each energy range n and may particularly be given by $$\delta = C \frac{1}{\sqrt{\lambda_{i,n}}},$$

where C is a suitably selected constant

Thus, on the basis of a cost function as provided in equation (10), it is possible to perform the image reconstruction in a multi-channel CT apparatus 1 in a similar way as described above for a CT apparatus 1 performing measurements for a single material/energy range. In particular, it is possible for the image reconstrunction unit 10 to use such a cost function for reconstructing one or more image(s) in a similar iterative procedure on the basis of the projection values determined on the basis of the measurements and the corresponding calculted projection values. In so doing, the image reconstruction unit 10 may reconstruct one image for each material and/or a combined image showing the attenuation by the plural materials.

A further variant of the invention can be implemented in a single-channel CT apparatus 1 performing measurements for a single material and in a multi-channel CT apparatus 1 performing measurements for plural materials. In the following, this variant is particularly described in connection with a single-channel CT apparatus 1 by way of example. However, the person skilled in the art understands that it can be implemented in a multi-channel CT apparatus in a similar way.

In the single-channel CT apparatus 1 described above, the cost function independently takes account of the available differences between the measured projection values and the calculated projection values. In the present variant of the invention, differences are combined to form sets of differences, and the cost function depends on the sets of the differences rather than it depends on the differences separately.

The sets of differences are preferably formed on the basis of differences calculated for neighboring measured projections values. This does particularly mean that each set contains a group of differences calculated on the basis of measured projection values captured at spatially adjacent locations. In addition or as an alternative, the sets may be formed of differences measured at the same spatial locations but at consecutive detection times. Such differences are likewise regarded as differences for neighbouring measured projection values herein.

The reason for forming the sets differences in such a way is that systematic deviations of the measured projection values from the calculated projections values, which may particularly arise in case of motions of the object, usually can be found in connected regions of the so-called sinogram formed by the measured projections values.

Each of the sets of differences may include the same number of differences in one embodiment. However, it is likewise possible that one or more sets include a different number of differences than the other sets. In particular, the sets including differences for projection values measured at the edges of the sinogram, e.g. at the edge of the spatial area covered by the detection unit 6 during the measurements, may include less differences than other sets of the differences. This particularly allows for a creation of the sets of differences indpendent of the total number of availabe measured projection values.

Moreover, each available difference, i.e. a difference for each measured projection value, is preferably included in at least one set of differences. Hereby, it is ensured that all measured projection values are taken into account in the reconstruction of the image. It is also possible that one or more of the available differences are include in plural sets of the differences. This corresponds to an image reconstruction on the basis of overlapping neighborhoods or sets, which usually leads to a higher computational complexity but may improve the quality of the reconstructed image.

On the basis of sets of m differences, the cost function used in the image reconstruction may be written as:

$$L'(\mu) = \sum_{k=0}^{N^S} \psi\left(\Delta_{i_1^k}, \ldots, \Delta_{i_m^k}; c'\right) \text{ with } \Delta_l = \sqrt{w_l} \sum_j (a_{lj}\mu_j - y_l). \quad (11)$$

In this embodiment, the cost function is calculated based on weigthed differences included in the sets of differences. So, $\Delta_l$ is the weighted difference between the l-th calculated projection value $\Sigma a_{ij}\mu_j$ and the corresponding l-th measured projection value $y_l$. The weight $w_l$ may be determined on the basis of the variance $\sigma_l^2$ determined for the projection value $y_l$; in particular it may be given by $w_l = A \cdot 1/\sigma_l^2$ with a suitably selected proportionality factor A, which may e.g. be one or greater. $N^S$ denotes the number of sets of differences, and each set contains m differences. These differences are referred to using the indices $i_p^k$, where one index $i_p^k$ relates to the p-th difference in the k-th set of differences. The parameter c' in equation (11) is a threshold value, which will be further described herein below. Preferably, the parameter c' is calculated on the basis of the set size m. Thus, the parameter has a fixed value, when all sets have the same size. If this is not the case, the value of c' is selected based on the set size for each set.

The function L' in equation (11) is a continuous function of the differences $\Delta_l$. This does particularly mean that the function depends on the value of each difference $\Delta_l$. Hereby, it is ensured that all available measured projection values are actually used for reconstructing the image. On the basis of the differences $\Delta_l$ of each set of differences, a parameter is calculated and the cost function depends on the parameter for a respective set of differences in accordance with a certain degree of dependence, where the degree of dependence is determined on the basis of the parameter calculated for the set of differences. More specifically, the cost function L' depends less on a parameter for a first set of differences than it depends on a parameter for a second respective set of differences, which is smaller than the parameter for the first set of differences. Hereby, it can be achieved that the reconstructed image includes less artifacts resulting from systematic deviations between the measured and calculated projection values, which may particularly be caused by a motion of the object or similar conditions.

Preferably, the parameter for one set of differences corresponds to the square root of the sum of the squares of the weighted differences included in the set, i.e. the parameter for the k-th set may be given by $$\sqrt{\sum_{l=1}^{m} \Delta_{i_l^k}^2}.$$

For smaller values of this parameter, the cost function L' does depend preferably quadratically on this parameter. In particular, the relevant part of cost function may be given by $$1/2 \sum_{l=1}^{m} \Delta_{i_l^k}^2.$$

This corresponds to the conventional cost function and allows for a proper image reconstruction in case the measured projection values do only include statistical deviations from the calculated projection values and do not include systematic deviations resulting from object motion or similar conditions. For larger values of the parameter, the cost function may depend less than quadratically, e.g. linearly, on the parameter assigned to a certain set of differences.

The threshold value c' in equation (11) may correspond to an upper limit of the parameter for which the cost function has the aforementioned form with respect to a certain set of differences. The threshold value c' is preferably selected such that the parameters for sets of differences for measured projection values which are only subject to statistical fluctation are smaller then the threshold value in a predetermined percentage of cases. Thus, in other words, the threshold value c' is determined on the basis of a predefined quantile of the probability distribution of the statistical fluctuations.

In one embodiment, the threshold value c' is selected such that the parameters for sets of differences for measured projection values which are only subject to statistical fluctuations are smaller than the threshold value in 95% of all cases. In this embodiment, the threshold value is derived on the basis of the 95% quantile of the probability distribution of the statistical fluctuations.

This approach is similar to the above-described approach using a cost function which takes account of each difference of projection values separately. So, a selection of a value of c=2 in equation (1) ensures that the cost function depends quadratically on a difference which is only subject to statistical deviations in approximately 95% of all cases.

Compared to the above-described approach, the calcuation of the cost function on the basis of sets of differences has the advantage that smaller differences including measured projection values affected by systematic deviations are sufficient to exceed the threshold value c'. Hence, this calculation is more sensitive to such systematic deviations and, thus, allows for a more efficient mitigation of artifacts resulting from the deviations.

The increased sensitivity to systematic deviations can be illustrated on the basis of the following considerations: Assuming that all measured projection values are only subject to the same systematic deviation, all differences between the calculated and measured projection values have the same value $\Delta_S$. In this case, the aforementioned parameter $$\sqrt{\sum_{l=1}^{m} \Delta_{i_l k}^2}$$

is equal to $\sqrt{m} \cdot \Delta_S$, and the critical weighted difference, i.e. the weighted difference for which the parameter is equal to the threshold value c' is given by $\Delta_S = c'/\sqrt{m}$. In the following table, exemplary values for c' and the corresponding critical weighted difference are provided for different set sizes m. Here, the values for the threshold c' are all selected such that the parameters for sets of weighted differences for measured projection values which are only subject to statistical fluctation would be smaller then the threshold value in 95% of all cases.

| Set size m | Threshold value c' | Critical weighted difference $\Delta_S$ |
| --- | --- | --- |
| 1 | 1.96 | 1.96 |
| 4 | 3.08 | 1.54 |
| 8 | 3.94 | 1.39 |
| 16 | 5.13 | 1.28 |
| 32 | 6.80 | 1.20 |

From the table, it can be appreciated that—compared with the approach in which all weighted differences are considered separately (m=1)–the critical weighted difference is smaller when sets of plural weigthed differences are considered. Moreover, it can be seen that the critical weighted differences decreases with increasing set size m.

As said above, these considerations apply when all measured projection values are only subjcet to a systematic deviation from the calculated values. It has been found that the dependence of the critical weighted difference on the set size is even stronger when also statistical fluctuations are taken into account.

In one specific implementation of equation (11), the function $\psi(\Delta_{i_1 k}, \ldots, \Delta_{i_m k}; c')$ may be the Huber function $$\Psi\left(\sqrt{\sum_{l=1}^{m} \Delta_{i_l k}^2}, c'\right)$$

with $\Psi(x,\delta)$ as defined in equation (2). In this case, the cost function depends linearly on the parameter, when the parameter is greater than the threshold value c'. However, the function $\psi(\Delta_{i_1 k}, \ldots, \Delta_{i_m k}; c')$ may likewise have another form fullfilling the above mentioned conditions. One example of an alternative function is a function which provides a smooth transition to a linear dependence on the parameter $$\sqrt{\sum_{l=1}^{m} \Delta_{i_l k}^2}$$

for values of the parameter exceeding the threshold value c'.

In a further embodiment, the function $\psi(\Delta_{i_1 k}, \ldots, \Delta_{i_m k}; c')$ has the form $$\psi\left(\Delta_{i_1 k}, \ldots, \Delta_{i_m k}; c'\right) = \qquad (12)$$

$$\overline{\psi}\left(\sqrt{\sum_{l=1}^{m} [\Delta_{i_l k}^2 \theta(\Delta_{i_l k})]}, c''\right) + \overline{\psi}\left(\sqrt{\sum_{l=1}^{m} [\Delta_{i_l k}^2 \theta(-\Delta_{i_l k})]}, c''\right),$$

where $$\theta(x) = \begin{cases} 1 & \text{if } x \geq 0 \\ 0 & \text{else} \end{cases}$$

is the Heaviside step function. The function $\overline{\psi}$ may be the Huber function or another suitable function fullfilling the above-described requirements.

In this embodiment, the postive weigthed differences (first summand on the right side of equation (12)) are evaluated separately from the negative weighted differences (second summand on the right side of equation (12)). This is due to the fact that weigthed differences calculated for measured projection values subject to a systematic deviation are expected to have the same sign within a small region. Thus, when the sets of weighted differences are properly formed, the cost function should only depend less then quadratically on the parameter for a set of weigthed differences, if nearly all weighted differences have the same sign. This is achieved, when the funtion $\psi$ has the form defined in equation (12).

The threshold value c" in equation (12) can be set to a lower value than the threshold value c' in equation (11) in order to achieve the same effect with respect to statistical fluctuation (e.g. to achieve that the parameters for sets of differences for measured projection values which are only subject to statistical fluctation are smaller then the threshold value in 95% of all cases), since statistical fluctuations will approximately lead to only m/2 non-zero terms in both summands on the right side of equation (12). Such a lower threshold further improves the sensitivity to systematic deviations.

Although in above described embodiments the projection values are CT projection values, in other embodiments the projection values providing unit can be adapted to provide another kind of projection values and the reconstruction unit can be adapted to reconstruct an image based on these other kinds of projection values. For instance, positron emission tomography (PET) or single photon emission tomography (SPECT) projection values can be provided and used to reconstruct a PET or SPECT image, respectively.

Although in above described embodiments the projection values are line integral values, in other embodiments the projection values can also be intensities, i.e. detection values being directly indicative of the respective intensities can be provided and the reconstruction unit can be adapted to reconstruct the image based on the provided detection values.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations like the simulation of the forward projection for calculating the projection values, the estimation of the standard deviations, the minimization of the cost function, et cetera performed by one or several units or devices can be performed by any other number of units or devices. These operations and/or the control of the image generation apparatus in accordance with the image generation method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an image generation apparatus for generating an image of an object. A reconstruction unit reconstructs the image based on provided measured projection values such that costs defined by a cost function are reduced, wherein the cost function depends on differences between calculated projection values, which have been determined by simulating a forward projection through the image, and the provided measured projection values, and wherein a degree of dependence of the cost function on a respective difference depends on the respective difference. This can allow for a consideration of a degree of disturbance of the measured projection values by motion and/or by an incomplete illumination of the object during the reconstruction process, which can lead to a reconstruction of an image having an improved image quality.

The invention claimed is:

1. An image generation apparatus for generating an image of an object, the image generation apparatus comprising:
a detection device for providing measured projection values of the object,
a computer for reconstructing the image based on the provided measured projection values such that costs defined by a cost function are reduced, wherein the cost function depends on differences between calculated projection values, which have been determined by simulating a forward projection through the image, and the provided measured projection values, and
wherein the cost function depends a first difference of the differences weighted by a first weight and a second difference of the differences weighted by a second weight, and the second weight is smaller than the first weight.

2. The image generation apparatus as defined in claim 1, wherein the cost function is adapted to depend stronger on a respective difference relative to the other differences, if the respective difference is smaller than a threshold, and to depend less on a respective difference relative to the other differences, if the respective difference is larger than the threshold.

3. The image generation apparatus as defined in claim 2, wherein the threshold depends on the standard deviation of the measured projection value to which the respective difference corresponds.

4. The image generation apparatus as defined in claim 1, wherein the cost function is adapted to depend quadratically on a respective difference, if the respective difference is smaller than a threshold, and to depend linearly on a respective difference, if the respective difference is larger than the threshold.

5. The image generation apparatus as defined in claim 1, wherein the cost function is adapted such that the degree of dependence of the cost function on the respective difference further depends on the standard deviation of the measured projection value to which the respective difference corresponds.

6. The image generation apparatus as defined in claim 1, wherein the cost function is adapted to further depend on the standard deviation of the measured projection value to which the respective difference corresponds, wherein the cost function is adapted to depend stronger on the standard deviation of the measured projection value to which the respective difference corresponds, if the respective difference is smaller than a threshold, and to depend less on the standard deviation of the measured projection value to which the respective difference corresponds, if the respective difference is larger than the threshold.

7. The image generation apparatus as defined in claim 1, wherein each of the measured projection values is generated based on a measurement of radiation, which has been generated by a radiation source, after having traversed an object along a radiation path.

8. The image generation apparatus as defined in claim 7, wherein for at least one of the radiation paths, plural projection values are generated, each projection value being generated in accordance with one of plural materials.

9. The image generation apparatus as defined in claim 8, wherein the cost function depends on a transform of a vector specifying the differences between the measured projection values and the calculated projection values for one radiation path and the plural materials or on a set of transforms of vectors specifying the difference between the measured and the calculated projection values for plural radiation paths and the plural materials, each transform being calculated based on eigenvectors of a covariance matrix indicating covariances between the measurements of projection values for the plural materials.

10. The image generation apparatus as defined in claim 1, wherein each set of differences includes differences calculated for projection values measured at adjacent locations and/or consecutive detection times.

11. An image generation method for generating an image of an object, the image generation method comprising:
providing measured projection values of the object by a measured projection values providing unit,
reconstructing the image based on the provided measured projection values such that costs defined by a cost function are reduced by a reconstruction unit, wherein the cost function depends on differences between calculated projection values, which have been determined by simulating a forward projection through the image, and the provided measured projection values, and
wherein the cost function depends a first difference of the differences weighted by a first weight and a second difference of the differences weighted by a second weight, and the second weight is smaller than the first weight.

12. A non-transitory computer readable medium storing instructions that when executed by a computer cause the computer to perform a method comprising:
providing measured projection values of the object by a measured projection values providing unit,
reconstructing the image based on the provided measured projection values such that costs defined by a cost function are reduced by a reconstruction unit, wherein the cost function depends on differences between calculated projection values, which have been determined by simulating a forward projection through the image, and the provided measured projection values, and
wherein the cost function depends a first difference of the differences weighted by a first weight and a second difference of the differences weighted by a second weight, and the second weight is smaller than the first weight.

13. The method as defined in claim 11, wherein the cost function is adapted to depend stronger on a respective difference relative to the other differences, if the respective difference is smaller than a threshold, and to depend less on a respective difference relative to the other differences, if the respective difference is larger than the threshold.

14. The method as defined in claim 13, wherein the threshold depends on the standard deviation of the measured projection value to which the respective difference corresponds.

15. The method as defined in claim 11, wherein the cost function is adapted to depend quadratically on a respective difference, if the respective difference is smaller than a threshold, and to depend linearly on a respective difference, if the respective difference is larger than the threshold.

16. The method as defined in claim 11, wherein the cost function is adapted such that the degree of dependence of the cost function on the respective difference further depends on the standard deviation of the measured projection value to which the respective difference corresponds.

17. The method as defined in claim 11, wherein the cost function is adapted to further depend on the standard deviation of the measured projection value to which the respective difference corresponds, wherein the cost function is adapted to depend to a greater degree on the standard deviation of the measured projection value to which the respective difference corresponds, if the respective difference is smaller than a threshold, and to depend to a lesser degree on the standard deviation of the measured projection value to which the respective difference corresponds, if the respective difference is larger than the threshold.

18. The method as defined in claim 11, wherein each of the measured projection values is generated based on a measurement of radiation, which has been generated by a radiation source, after having traversed an object along a radiation path.

19. The method as defined in claim 18, wherein for at least one of the radiation paths, plural projection values are generated, each projection value being generated in accordance with one of plural materials.

20. The method as defined in claim 19, wherein the cost function depends on a transform of a vector specifying the differences between the measured projection values and the calculated projection values for one radiation path and the plural materials or on a set of transforms of vectors specifying the difference between the measured and the calculated projection values for plural radiation paths and the plural materials, each transform being calculated based on eigenvectors of a covariance matrix indicating covariances between the measurements of projection values for the plural materials.

* * * * *